Dec. 5, 1939.  F. L. PRUYN  2,182,094
FILTER BED CLEANING
Filed Sept. 24, 1938
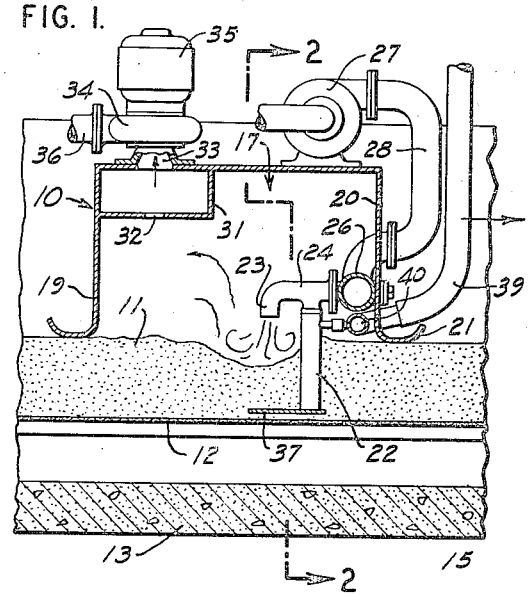
INVENTOR
FRANCIS L. PRUYN
BY
his ATTORNEY Patented Dec. 5, 1939

2,182,094

UNITED STATES PATENT OFFICE 2,182,094

FILTER BED CLEANING

Francis L. Pruyn, Sea Girt, N. J.

Application September 24, 1938, Serial No. 231,585

9 Claims. (Cl. 210—128)

This invention relates to filter bed cleaning in filtration of liquids and more particularly to filter bed cleaning means adapted to travel along a downward flow filter bed of granular material, such for example as sand, and remove accumulated impurities.

Heretofore it has been proposed to clean a filter by means of a cleaner movable over a filter bed of granular material and comprising a caisson or chamber with an open bottom engaging the upper surface of the filter bed, means for cleaning the granular material beneath said caisson and collecting the dirt and impurities in said caisson, and means for discharging dirty water from said caisson. Such proposed cleaning means included hollow teeth or tubes extending downwardly from the caisson and adapted to serve as a rake in agitating the granular material or sand during the travel of the caisson. The sand, with accumulated solids or impurities, was drawn from the lower part of the bed upwardly through the tubes above the top of the bed in the caisson and discharged into the interior of the caisson, the sand which was washed in this action being deposited on the top of the bed.

Although the prior cleaning apparatus just referred to gave improved results, various difficulties were encountered. For example, although it was desired to pass upwardly through the hollow teeth material beneath the ends of the teeth, there was a tendency for material around the teeth to settle to the lower ends of the teeth without any control and then to be drawn up through the teeth without any substantial drawing up of the material below the ends of the teeth. Also when the cleaner was thrown out of operation there was, unless prevented by special means, a reverse flow through the hollow teeth tending to clog the teeth with sand and impurities and thereby to interfere with or prevent upward flow through the teeth when the cleaner was again brought into operation.

An important object of the invention is to provide for improved filter bed cleaning. Another object of the invention is to provide improved filter bed cleaning means. A further object of the invention is to provide an improved filter bed cleaner adapted for traveling along the filter bed and for raising granular material from a lower part of the filter bed, cleaning it and discharging it on the top of the filter bed. Another object is to provide a filter bed cleaner, comprising hollow teeth extending downwardly to the lower part of the bed to enable granular material from the bottom of the bed to be passed upwardly therethrough and discharged on the top of the filter bed, of means for controlling the direction of flow of such granular material and liquid to the inlets at the lower ends of said teeth. Another object of the invention is to provide means at the bottom of a hollow tooth, projecting downwardly from a traveling cleaner into a filter bed, for assuring the upward passage through the tooth of the granular material beneath the lower end of said tooth. A further object is to provide means for passing sand upwardly through said hollow teeth including means for agitating the granular material at the lower ends of the teeth and thereby obviating any clogging of teeth caused by reverse flow or otherwise.

The invention may be carried out in connection with filter bed cleaning means comprising a caisson traveling over a filter bed of granular material, hollow teeth extending downwardly from the caisson into the filter bed, means for passing filter bed material and impurities upwardly through the teeth and depositing the granular material, elevated and cleaned in this operation, on the top of the filter bed. To control the flow of granular material to the lower ends of the teeth, suitable baffle means may be provided at the lower ends of said teeth. Such baffle means may comprise individual baffles for the hollow teeth or a single baffle having a corresponding number of openings may be associated with a plurality of teeth. As the cleaner advances, the cleaner teeth pile up the sand in front of them, and the top surface of this sand carries a heavy deposit of sludge which comes substantially undisturbed to position for subjection to the jet action from the tops of the teeth and there is blown or driven off as dirty water which is removed from the caisson by suitable means such as a pump. Before such baffles or tail pieces were used, it was found that the tendency of the sand was to follow down the back of the teeth since this sand had been disturbed by the passage of the teeth therethrough. The result was that sand that had already been cleaned was being pulled again through the teeth and also top surface sand carrying impurities settled thereon to a considerable extent. These troubles were substantially remedied by the use of baffles or tail pieces extending much farther to the rear than to the front.

A second and very important action of such baffles or tail pieces is to force what sand is fed into the lower end of a tooth to pass around and beneath the corresponding baffle, thereby assuring the removal of the lowermost part of the sand immediately over the metal supporting screen, thereby producing a scouring action along the screen and thorough removal of any accumulated sludge that may have fastened on the top of the screen as well as bacterial jelly which forms rapidly in a downflow filter. As a matter of fact, before the use of the baffles or tail pieces, the bacterial jelly-like growth would effectually plug the screen rendering it necessary on such occasions to drawn down the liquid and turn over the sand with a shovel, thus interrupting the use of the filter.

The upward movement of the granular material through the teeth may be assisted and clogging due to reverse flow may be obviated by suitable means, such as fluid jets, at the lower ends of the hollow teeth adapted to agitate material at such lower ends and assist upward flow through the teeth. The fluid of the jets is preferably either water or compressed air, the latter tending to produce an air lift effect.

While filter bed cleaners of the class referred to may be used on filter beds of various shapes and sizes, one important use is in cleaning filter beds in channels surrounding settling tanks and receiving supernatant liquid from the upper parts of said tanks.

Other objects, features and advantages will appear upon consideration of the following description and of the drawing in which:

Fig. 1 is a fragmentary view, partly in section, illustrating one form of filter bed cleaner, embodying the present invention, in position relative to a filter bed;

Fig. 2 is a section taken along the line 2—2 of Fig. 1;

Fig. 3 is a view on a larger scale including a section of one of the devices shown in Fig. 1;

Fig. 4 is a bottom view of the baffle shown in Figs. 1 and 2;

Fig. 5 is a view similar to Fig. 4 but illustrating a modification in which each hollow tooth is provided at its lower end with an individual baffle;

Fig. 6 is a view, similar to Fig. 3 but on a smaller scale, illustrating another combination of baffle means with means for agitating material at the bottom thereof to prevent clogging and assure flow to the right direction to the lower ends of the teeth; and Fig. 7 is a view, similar to Fig. 3 but on a small scale, illustrating another embodiment of the invention.

Referring to Figs. 1 and 2, a filter bed cleaner 10 embodying one form of the present invention is illustrated in connection with a filter bed 11 of suitable granular material, such as sand, resting on a support or screen 12. Said support 12 may be spaced from the bottom 13 of the channel or tank 14 (Fig. 2) containing the filter bed, so as to provide a filtered liquid compartment or chamber 15 from which the liquid may be discharged as desired. It should be understood that preferably the cleaner 10 extends completely across the tank or channel 14 of which only the bottom and one side wall 16 are shown. The channel 14 may extend around a settling tank (not shown), an arrangement frequently used for combined settling and filtration.

The filter bed cleaner 10, which may be moved along the channel 14 by any suitable means, is illustrated as comprising a caisson or chamber 17 open at its bottom which rests upon the filter bed 11, and having side walls 18 engaging the filter bed 11 to effect a substantial seal therewith, a rear wall 19 curved rearwardly and upwardly at its lower edge to smooth the part of the filter bed just cleaned and to maintain a sufficient seal with the upper surface of the filter bed, and a front wall 20 of which the lower edge is turned forwardly and upwardly to provide a forwardly extending upturned lip 21 which serves to depress the sand and waste solids so that they will pass under the lower edge of said front wall.

As viewed in Fig. 1, the cleaner 10 moves to the right, this direction being indicated by the arrow at the left of this figure. During the movement of the cleaner some liquid and some solids enter the chamber or caisson 17 under the front wall thereof and solids and liquid from the filter bed 11 are passed upwardly through the filter bed into the caisson through central passages 22a in suitable devices or hollow teeth 22 which project downwardly to the lower part of the filter bed and serve to rake and agitate the granular material of the bed. The hollow teeth 22 may, as long as they take care of all of the material throughout the width of the cleaner, be arranged in any suitable manner. As illustrated, there is a single row of hollow teeth 22 extending across the chamber or caisson. It should, however, be understood that the hollow teeth may be arranged in a plurality of successive rows and they may also be arranged in staggered position in said successive rows.

The granular material and accumulated solids from lower portions of the filter bed may be passed upwardly through the hollow teeth 22 in any suitable manner, as by suction induced in said hollow teeth, and discharged, for example, through downwardly directed spouts 23. Of course these spouts may take other forms. As illustrated, the upward flow through each hollow tooth 22 and discharge through a spout 23 may be effected by means including a pipe section 24 connected at its lower side with the upper end of the corresponding hollow tooth 22 and carrying one of the spouts 23 at its rear end.

Although the upward flow through a hollow tooth 22 from the bottom of the bed 11 may be effected in various ways, it is effected according to the illustrative form of apparatus by means of a nozzle 25 fitting in the pipe 24 and extending rearwardly to a position above the upper end of the corresponding hollow tooth 22, so that a jet of fluid such as water or compressed air discharged from the nozzle 25 will act to cause an upward flow through the hollow tooth 22 and cause the liquid and solids thus lifted to be discharged through the corresponding spout 23 downwardly to the upper surface of the filter bed. Fluid, such as water or compressed air, may be supplied to the nozzles 25 in any suitable manner but, as illustrated, is supplied from a manifold 26 extending across the caisson or chamber near its front wall 20, the manifold being supplied with fluid from a pump 27 connected with the manifold by a pipe or duct 28, and driven by a motor 29. As illustrated in Fig. 3, the manifold 26 may be supported on the front wall 20 of the caisson and each nozzle 25 may pass completely through the manifold 26 and receive fluid therefrom through suitable openings 30 in the peripheral wall of the nozzle.

During the upward flow, through the hollow teeth 22, of liquid and granular material together with collected impurities, and the discharge of the liquid and solids through the spouts 23 the granular material will be washed and scoured and when discharged from the spouts 23 will fall to the surface of the filter bed while being further washed and scoured, the impurities being left in suspension in the liquid. The sand discharged from the spouts and settling on the bed also serves to drive or blow off the layer of solids on the top of the filter bed. The dirty liquid thus produced must be withdrawn from the caisson and preferably is withdrawn through a suction chamber or box 31 at the top and rear of the caisson, being drawn into the chamber 31 through one or more openings 32 and discharged from the chamber to the outside of the caisson through the outlet 33. This withdrawal of dirty water through the outlet 33 may be effected in any suitable manner but as here illustrated, is effected by means of a suction pump 34 driven by a motor 35 and discharging the dirty liquid through a duct 36 to any suitable point.

The apparatus hereinbefore described is similar to prior apparatus and novel features used in connection with this apparatus will now be described.

In operating apparatus of this kind, it has been found that there is a tendency for the granular material of the filter bed to move without suitable control downwardly along the hollow teeth 22 and to pass into the lower ends of the teeth 22, causing the material beneath the hollow teeth to be left at the lower part of the filter bed, thus preventing the desired operation of the apparatus. This downward movement is principally at the rear of the teeth and may be due partly to the raking action of the teeth and partly to the downward discharge from the spouts which tends to produce a depression in the upper surface of the filter bed and to produce agitation of the material beneath the depression, thus putting it into shape to be drawn down too readily to the lower ends of the teeth. According to the present invention, such condition may be obviated by providing suitable baffle means at the lower ends of the hollow teeth 22. According to one manner of carrying out the invention, a row of hollow teeth 22 may be provided with a single baffle 37 having suitable openings 38 therein registering with the lower ends of the hollow teeth 22, as illustrated in Figs. 1, 2, 3 and 4. Obviously granular material or sand moving downwardly along the sides of the hollow teeth must pass outwardly around the edge of the baffle 37 before entering the lower ends of the hollow teeth. Consequently the granular material immediately beneath the lower ends of the hollow teeth will be drawn upwardly through the hollow teeth.

Inasmuch as the bed at the rear of the teeth has been loosened and opened up and the tendency is for the granular material in this locality, not only material which has just been cleaned but top granular material carrying impurities which have settled thereon, to be drawn downwardly to the lower ends of the hollow teeth and upwardly therethrough. Obviously, it is more desirable to draw to the bottoms of the hollow teeth granular material at the front of the teeth. To prevent downward-flow at the rear of the hollow teeth 22 and permit entrance to the lower ends of the teeth of granular filter-bed material from the front of the teeth together with accumulated solids and dirty water, the baffle 37 may be made to extend much farther to the rear of the teeth 22 than to the front, as illustrated in Figs. 1, 3 and 4.

As illustrated in Fig. 5, the baffle means at the lower ends of the hollow teeth 22 may comprise separate baffles 37a individual to the hollow teeth. Although the baffles 37a may take different forms, as illustrated in Fig. 5, they are rounded in form and provided at their front portions with openings 38a to register with the openings in the lower ends of the central passages of the hollow teeth.

In order to avoid accumulation at the lower ends of the hollow teeth, the material at the lower ends of these teeth may be agitated by any suitable means. As disclosed in Figs. 1, 2 and 3, the agitation of the material at the lower ends of the hollow teeth may be effected by the use of fluid such as compressed air or water under pressure. As illustrated in Figs. 1 and 2, the fluid under pressure is supplied through a pipe or duct 39 to a manifold 40 extending across the chamber and connected by individual ducts 41 with the interior of hollow chambers 42 extending around the longitudinal or central passages 22a of the hollow teeth 22. These hollow chambers 42 are closed at their upper ends in any suitable manner and at their lower ends may be closed by the portions of the baffles extending outwardly beyond the central passages of the hollow tooth 22.

As illustrated, the fluid under pressure in the hollow chambers 32 may be discharged therefrom through inwardly and downwardly directed inclined openings 43 in the baffles and also through inwardly and upwardly directed openings 44 in the walls separating the central passages of the hollow teeth from the surrounding hollow chambers. The fluid will pass through the openings 43 and agitate and loosen the material beneath the lower ends of the central passages 22a of the hollow teeth 22 and the fluid discharged through the openings 44 will produce upwardly directed streams which will serve not only to agitate the material passing upwardly through the hollow teeth but will also act to produce an upward flow through said hollow teeth and may do so even without assistance from any other means. Such introduction of fluid under pressure at the lower ends of the hollow teeth 22 is of particular value in preventing clogging when material collects in the hollow teeth due to reverse flow resulting from throwing the cleaner out of operation, as by stopping the pumps 27 and 34.

In Fig. 6 there is disclosed another modification of the baffle means at the bottom of a hollow tooth and of the means for agitating the material at the lower end of the hollow tooth. According to this form each baffle 37b is in the form of a chamber having an open lower end of considerable greater area than the lower end of the corresponding hollow teeth 22a and at its top an opening registering with the lower end of the hollow tooth. As illustrated, the baffle device or chamber 37b is bell shaped, that is it gradually flares outwardly from the top to the bottom. This type of baffle not only serves to control the material passing downwardly along the sides of the hollow tooth and directly into the lower ends thereof, but also provides a chamber in which may collect filter bed material carried back into the hollow tooth by reverse flow due to shutting off the operation of the cleaner. Agitation of solids at the lower side of the baffle device may be effected by fluid under pressure and, as illustrated in Fig. 6, this may be done by the use of a manifold 40a extending across the caisson and supplying fluid under pressure to nozzles 45 having their tips located adjacent the outer edges of the baffle means and directed inwardly thereunder.

In the modification illustrated in Fig. 7, each agitating and lifting device comprises a generally upright pipe or tooth 22b having at its upper end a downwardly turned and rearwardly extending spout 23b which may be integral therewith. In this form of the invention it is proposed to locate the pumping or lifting device near the bottom of the bed and also to utilize it for loosening any deposit of material when putting the cleaner into use. To this end the lower end of the tooth 22b is connected through a suitably curved portion with a generally horizontal pipe section 46 having at its lower side a projecting inlet or pipe 47. In the pipe section 46 with its discharge end over the inlet 47 is a nozzle 25b to which suitable fluid under pressure, such as water or air may be supplied from a manifold 26b through a duct 48. In this form also there may be provided suitable baffle means 37c beneath the inlets 47 and having openings registering therewith. It will be evident that fluid supplied through said nozzle 25b will not only produce an upward flow through pipes 22b during ordinary operation but will serve to remove at starting any material clogging the device.

It should be understood that various features may be changed and that certain features may be used without others, without departing from the true spirit and scope of the invention.

What I claim is:

1. In a filter bed cleaner adapted for movement over the granular bed of a downward flow filter for liquids, the combination with a caisson having an open bottom engaging the upper surface of said bed, a plurality of hollow raking devices extending from the interior of said caisson downwardly through the granular material to the lower part of the filter bed beneath the caisson, each of said devices having an inlet at its lower end and an outlet above the upper surface of the bed, means for passing granular material from the filter bed upwardly through said devices and discharging it into said caisson, and means for removing dirty liquid from the caisson, of baffle means at the lower ends of said devices to control the movement of granular material to said inlets.

2. In a filter bed cleaner adapted for movement over the granular bed of a downward flow filter for liquids, the combination with a caisson having an open bottom engaging the upper surface of said bed, a plurality of hollow raking devices extending from the interior of said caisson downwardly through the granular material to the lower part of the filter bed beneath the caisson, each of said devices having an inlet at its lower end and an outlet above the upper surface of the bed, means for passing granular material from the filter bed upwardly through said hollow devices and discharging it into said caisson, and means for removing dirty liquid from the caisson, of baffle means comprising individual baffles at the lower ends of said hollow devices to control the flow of granular material to said lower ends and to assure upward movement through said devices of granular material below said lower ends.

3. In a filter bed cleaner adapted for movement over the granular bed of a downward flow filter for liquids, the combination with a caisson having an open bottom engaging the upper surface of said bed, a plurality of hollow teeth extending from the interior of said caisson downwardly through the granular material to the lower part of the filter bed beneath the caisson, each of said devices having an inlet at its lower end and an outlet above the upper surface of the bed, means for passing granular material from the filter bed upwardly through said teeth and discharging it into said caisson, and means for removing dirty liquid from the caisson, of baffle means comprising substantially horizontal individual baffles with their forward portions at the lower ends of said teeth to prevent granular material at the rear of said teeth from passing to said lower ends and to assure upward movement through said teeth of granular material below said inlets.

4. In a filter bed cleaner adapted for movement over the granular bed of a downward flow filter for liquids, the combination with a caisson having an open bottom engaging the upper surface of said bed, a plurality of hollow raking devices extending from the interior of said caisson downwardly through the granular material to the lower part of the filter bed beneath the caisson, each of said devices having a passage with an inlet at its bottom and an outlet above the upper surface of the bed, means for passing granular material from the filter bed upwardly through said passages and discharging it into said caisson, and means for removing dirty liquid from the caisson, of baffle means comprising a horizontal baffle having openings in register with a plurality of said inlets to control the movement of granular material to said inlets and to assure upward movement through said passage of granular material beneath said inlets.

5. In a filter bed cleaner adapted for movement over the granular bed of a downward flow filter for liquids, the combination with a caisson having an open bottom engaging the upper surface of said bed, a plurality of hollow teeth extending from the interior of said caisson downwardly through the granular material to the lower part of the filter bed beneath the caisson, each of said devices having an inlet at its lower end and an outlet above the upper surface of the bed, means for passing granular material from the filter bed upwardly through said teeth into said caisson above the filter bed, and means for removing dirty liquid from the caisson, of fluid jet means for agitating and loosening the material at the lower ends of said teeth.

6. In a filter bed cleaner adapted for movement over the granular bed of a downward flow filter for liquids, the combination with a caisson having an open bottom engaging the upper surface of said bed, a plurality of hollow teeth extending from the interior of said caisson downwardly through the granular material to the lower part of the filter bed beneath the caisson, each of said devices having an inlet at its lower end and an outlet above the upper surface of the bed, means for passing granular material from the filter bed upwardly through said teeth into said caisson above the filter bed, and means for removing dirty liquid from the caisson, of fluid jet means at the lower ends of said teeth to agitate the material beneath said teeth and to urge upwardly in said teeth granular material and accumulated solids.

7. In a filter bed cleaner adapted for movement over the granular bed of a downward flow filter for liquids, the combination with a caisson having an open bottom engaging the upper surface of said bed, means to discharge dirty liquid from the caisson, a plurality of hollow teeth extending downwardly through the granular material to the lower part of the filter bed beneath the caisson, each of said devices having an inlet at its lower end and an outlet above the upper surface of the bed, means for passing granular material from the filter bed upwardly through said teeth into said caisson above the filter bed and discharging the cleaned granular material upon said bed, and means for removing dirty liquid from the caisson, of baffle means at the lower ends of said teeth to control the flow of granular material to said lower ends, and fluid jet means directing fluid downwardly and inwardly beneath the lower ends of said teeth and directing fluid upwardly in said teeth.

8. In a filter bed cleaner adapted for movement over the granular bed of a downward flow filter for liquids, the combination with a caisson having an open bottom engaging the upper surface of said bed, a plurality of hollow teeth extending from the interior of said caisson downwardly through the granular material to the lower part of the filter bed beneath the caisson, and means for removing dirty liquid from the caisson, each of said devices having an inlet at its lower end and an outlet above the upper surface of the bed, of fluid jet means for agitating and loosening the material at the lower ends of said teeth and passing granular material from the filter bed upwardly through said teeth into said caisson above the filter bed, and baffle means at the lower ends of said hollow teeth to assure the movement of contaminated granular material at the front of said teeth to said lower ends.

9. In a filter bed cleaner adapted for movement over the granular bed of a downward flow filter for liquids, the combination with a caisson having an open bottom engaging the upper surface of said bed, a plurality of raking devices extending from the interior of said caisson downwardly through the granular material to the lower part of the filter bed beneath the caisson, each of said devices comprising a pipe having an upright portion with an outlet above the upper surface of the bed and having near the bottom of the bed a forwardly extending generally horizontal portion with an inlet at its lower side, means for passing granular material from the filter bed upwardly through said devices and discharging it into said caisson comprising for each of said raking devices a nozzle projecting rearwardly into said substantially horizontal portion and means for removing dirty liquid from the caisson, of baffle means at the lower ends of said devices and extending principally rearwardly therefrom to prevent cleaned granular material at the rear of said devices from passing to said lower ends and to assure upward movement through said teeth of granular material below said inlets.

FRANCIS L. PRUYN.